J. T. WILSON.
PACKING RING FOR PISTONS.
APPLICATION FILED SEPT 6, 1916.
1,282,347.
Patented Oct. 22, 1918.
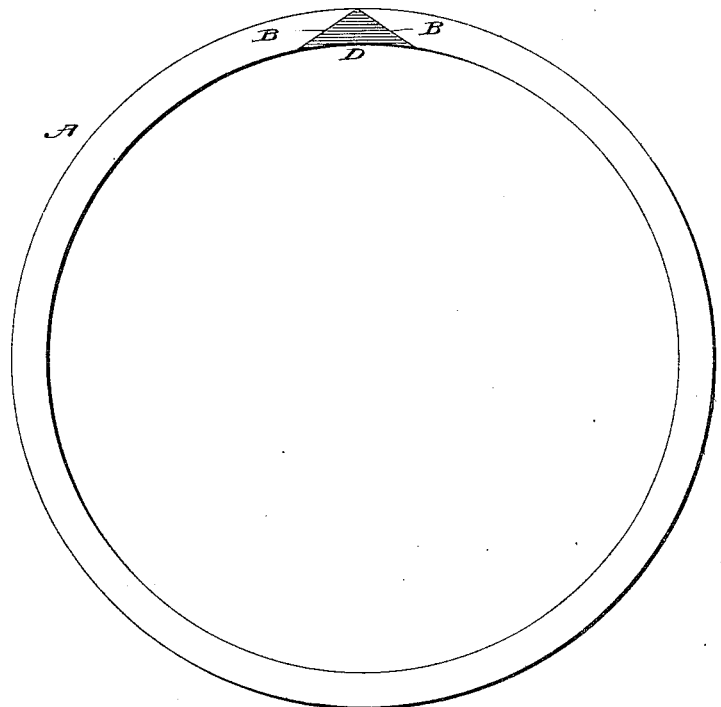
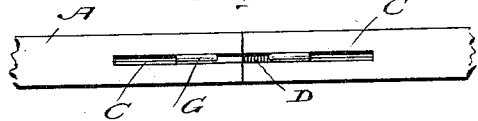
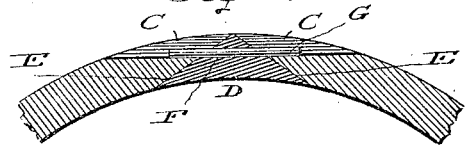
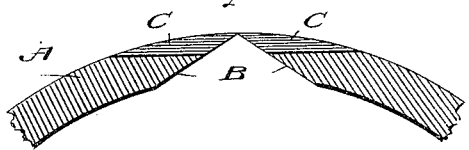
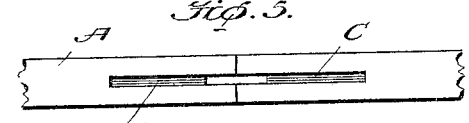
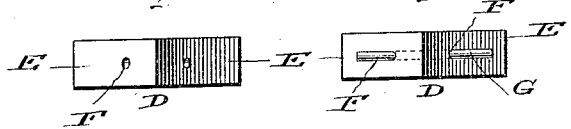
Witnesses —
Inventor —
John T. Wilson
By J. E. Stebbins
Attorney

UNITED STATES PATENT OFFICE.

JOHN T. WILSON, OF ALAMEDA, CALIFORNIA.

PACKING-RING FOR PISTONS.

1,282,347.

Specification of Letters Patent.

Patented Oct. 22, 1918.

Application filed September 6, 1916. Serial No. 118,752.

*To all whom it may concern:*

Be it known that I, JOHN T. WILSON, a citizen of the United States, residing at Alameda, in the county of Alameda and State of California, have invented certain new and useful Improvements in Packing-Rings for Pistons, of which the following is a specification.

The object of my invention is the provision of an improved metallic packing ring for engine pistons actuated by explosive gas, compressed air or steam, which shall be of simple construction, durable and effective in operation, and which shall be especially adapted for use in connection with gas engine pistons where frequent renewals of the rings are necessary.

It is desirable that a split or divided packing ring for gas engine pistons shall have a filler piece or joint plate which will maintain a proper position relative to the ends of the ring when the ring is detached and being shipped and handled, and also be held against excessive radial displacement relative to the ends of the ring when in use, and, further, on account of the small dimensions of the ring, should not be weakened by the removal of too much metal in forming the joint.

With these ends in view, my invention consists in a metallic, resilient split packing ring having ends with beveled surfaces, a wedge filler piece or joint plate engaging the said beveled surfaces, and means for holding the wedge piece in place and so it can move outwardly and maintain a tight joint with the ends of the ring under all conditions of service.

It further consists in certain novelties of construction and combinations of parts as herein set forth and claimed.

The accompanying drawing illustrates an example of the embodiment of the invention constructed and the parts combined according to the best method of procedure I have so far devised for the purpose.

Figure 1 is a side view in elevation of the complete ring as it appears when contracted.

Fig. 2 is a top plan view of the adjacent ends of the ring.

Fig. 3 is a vertical section of Fig. 2 taken adjacent the pin.

Fig. 4 is a vertical section of Fig. 2, the wedge filler piece being removed.

Fig. 5 is a top plan view of Fig. 2, the wedge joint plate or filler piece being removed.

Fig. 6 is a top plan view of the wedge joint plate or filler piece.

Fig. 7 is a view like Fig. 6 with the fastening pin in place.

Referring to the figures, A designates the body of the ring; B, the beveled surfaces of the ends of the ring, the surfaces being in planes which meet each other at the outer circumferential surface of the ring when the same is contracted; C, tangential slots made in the outer surfaces of the ends of the ring and intersecting the said beveled surfaces; D, the wedge joint plate or filler piece having surfaces E E which frictionally engage the beveled surfaces B, and a hole F for a pin; and G is a fastening pin rigidly secured to the wedge piece and within the hole F and its free ends located within the slots C and loosely engaging the metal defining the bottoms of the slots, as clearly shown by Fig. 3.

The ring is made practically a solid ring by the wedge filler fitting into the space between the beveled surfaces at the ends of the ring, and the wire pin holds the wedge in place through the medium of the ends of the pin fitting the slots milled in the exterior surfaces of the ends. The wedge will thus be maintained in place while the ring is being shipped and handled.

When the ring is in position within the groove of the piston and engaging the surface of the cylinder motive fluid will cause the wedge to hold the ring expanded and prevent the passage of motive fluid between the ring and the cylinder at the joint or elsewhere.

The body of the ring is preferably of cast metal and the scale is left on the inner surface to preserve its resiliency. The wedge filler piece should be of soft metal so that the thin or sharp edge of the metal at the apex in contact with the cylinder will not score it, and so that it may readily wear away and insure a tight frictional contact of the surfaces of the wedge with the beveled surfaces of the ends of the ring.

In operation under pressure the ring becomes like a solid or uncut ring, yet has the capability of contraction and expansion to adjust itself automatically relative to the surface of the cylinder under varying pressures and temperatures.

From the foregoing description taken in connection with the drawing it becomes obvious that I have provided a split ring and a joint of very simple construction, easily made, and efficient in operation, and which fulfils all the conditions set forth as the object of the invention.

What I claim is:

1. A resilient metallic packing ring for pistons having the adjacent free ends provided with inner beveled surfaces, a wedge filler piece or plate matching the said beveled surfaces of the ends of the ring, and a pin carried by the wedge and engaging the ends of the ring for holding the wedge filler piece in place.

2. A resilient metallic packing ring for pistons having the adjacent free ends provided with inner beveled surfaces and slots or seats, a wedge filler piece or plate with surfaces matching the said beveled surfaces of the ends of the ring, and a pin carried by the wedge and its ends located within the said slots or seats at the ends of the ring.

3. A cut packing ring with fashioned ends, a joint plate fashioned to fit the said ends of the ring and maintain a tight joint as the ring expands and contracts, and a pin carried by the joint plate and engaging the ends of the ring so as to loosely interlock the joint plate with the ring ends.

In testimony whereof I affix my signature.

JOHN T. WILSON.

Copies of this patent may be obtained for five cents each, by addressing the "Commissioner of Patents, Washington, D. C."